(12) United States Patent
Hironishi et al.

(10) Patent No.: US 8,509,628 B2
(45) Date of Patent: Aug. 13, 2013

(54) DIFFERENTIAL MULTILEVEL MODULATED OPTICAL SIGNAL RECEIVER APPARATUS

(75) Inventors: Kazuo Hironishi, Kawasaki (JP); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 598 days.

(21) Appl. No.: 12/565,812

(22) Filed: Sep. 24, 2009

(65) Prior Publication Data

US 2010/0040383 A1 Feb. 18, 2010

Related U.S. Application Data

(62) Division of application No. 11/289,508, filed on Nov. 30, 2005, now Pat. No. 7,613,403.

(30) Foreign Application Priority Data

Aug. 31, 2005 (JP) ................................. 2005-252659

(51) Int. Cl.
*H04B 10/06* (2006.01)
(52) U.S. Cl.
USPC .......................................... 398/205; 398/207
(58) Field of Classification Search
USPC .......................................... 398/205, 207, 214
See application file for complete search history.

(56) References Cited

U.S. PATENT DOCUMENTS

| | | | |
|---|---|---|---|
| 5,222,103 A | 6/1993 | Gross | |
| 5,355,243 A | 10/1994 | King | |
| 6,396,605 B1 | 5/2002 | Heflinger et al. | |
| 6,626,589 B1 | 9/2003 | Epworth | |
| 6,798,557 B1 | 9/2004 | Leven | |
| 7,613,403 B2 | 11/2009 | Hironishi et al. | |
| 2004/0081469 A1 | 4/2004 | Conway et al. | |
| 2005/0069330 A1 | 3/2005 | Kao et al. | |
| 2005/0111854 A1 | 5/2005 | Miyazaki | |
| 2006/0056845 A1 | 3/2006 | Parsons et al. | |
| 2007/0047966 A1 * | 3/2007 | Hironishi et al. .............. 398/161 |

FOREIGN PATENT DOCUMENTS

| | | |
|---|---|---|
| JP | 57-88410 A | 6/1982 |
| JP | 07-056034 A | 3/1995 |
| JP | 3201554 B2 | 8/2001 |
| JP | 2001-343542 A | 12/2001 |

(Continued)

OTHER PUBLICATIONS

European Search Report, mailed Feb. 6, 2007, and issued in corresponding European Patent Application No. 06017972.8-2415.

(Continued)

*Primary Examiner* — Shi K Li
(74) *Attorney, Agent, or Firm* — Fujitsu Patent Center

(57) ABSTRACT

A first optical splitter splits an input optical signal and outputs it to first and second optical paths. A second optical splitter outputs the optical signal from the first optical path to third and fourth optical paths. A third optical splitter outputs the optical signal from the second optical path to fifth and sixth optical paths. In the second optical path, 1-symbol delay element and π/4 phase shifter element are configured. In the fourth optical path, π/2 phase shifter element is configured. First and second adjuster circuits adjust the optical path length of the second and the fourth optical paths, respectively, by temperature control. A first optical coupler couples optical signals transmitted via the third and the fifth optical paths. A second optical coupler couples optical signals transmitted via the fourth and the sixth optical paths. Photodetectors convert the optical signals from the optical couplers into electrical signals.

3 Claims, 20 Drawing Sheets

(56) References Cited

FOREIGN PATENT DOCUMENTS

| JP | 2004-511128 A | 4/2004 |
|----|---------------|--------|
| WO | WO-02/27994 A1 | 4/2002 |
| WO | WO-02/51041 A2 | 6/2002 |
| WO | WO-03/028267 A1 | 4/2003 |
| WO | WO-03/049333 A1 | 6/2003 |
| WO | WO-03/063515 A2 | 7/2003 |

OTHER PUBLICATIONS

Extended European Search Report, Mailed Apr. 6, 2009, regarding corresponding European App. No. 08019925.0.

Takashi Matsumoto et al., "Microwave Communication", The Telecommunications Association, Aug. 25, 1976, pp. 129, 132.

Masao Yamamoto et al., "Optical Coherent Reception Experiment of DQPSK Signals by using Phase-Diversity Technique", NHK STRK R&D, Nov. 1, 1999, No. 58, pp. 18-25.

Michasel Ohm, "Optical 8-DPSK and Receiver with Direct Detection and Multilevel Electrical Signals", IEEE, Jul. 1, 2004, pp. 45-46.

USPTO, [TRAN] "U.S. Appl. No. 11/289,508 (parent)," [CTNF] Non-Final Office Action issued on May 2, 2008.

USPTO, [TRAN] "U.S. Appl. No. 11/289,508 (parent)," [CTRS] Requirement for Restriction/Election issued on Feb. 23, 2009.

USPTO, [TRAN] "U.S. Appl. No. 11/289,508 (parent)," [NOA] Notice of Allowance and Fees Due issued on Jun. 26, 2009.

* cited by examiner

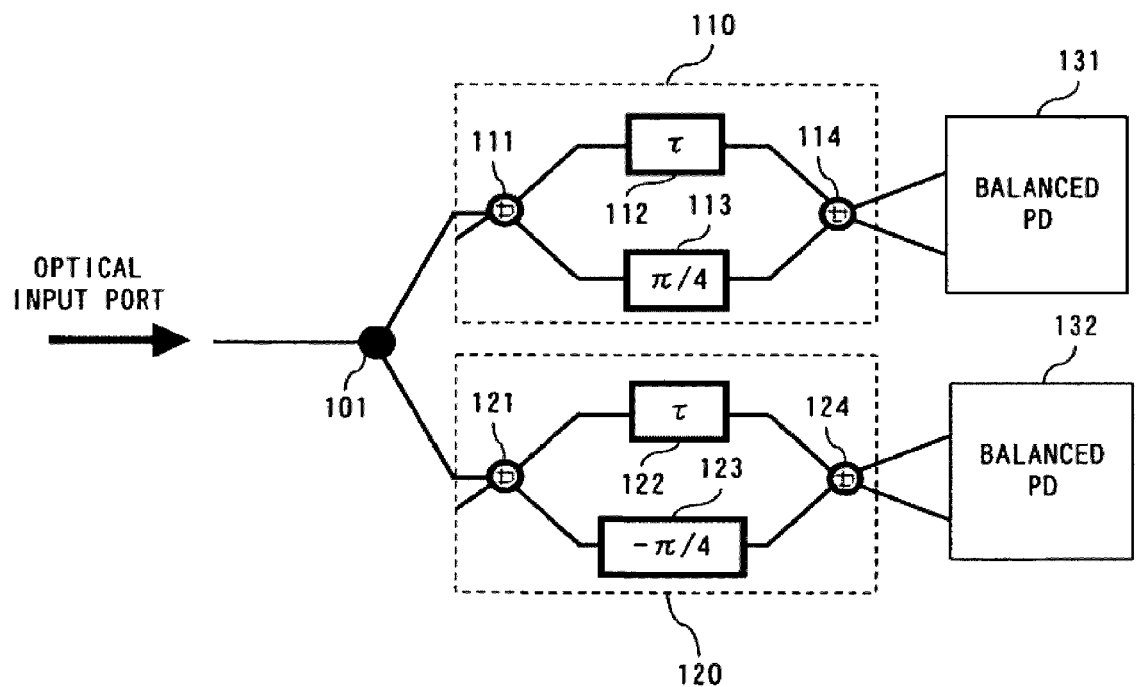
F I G. 1

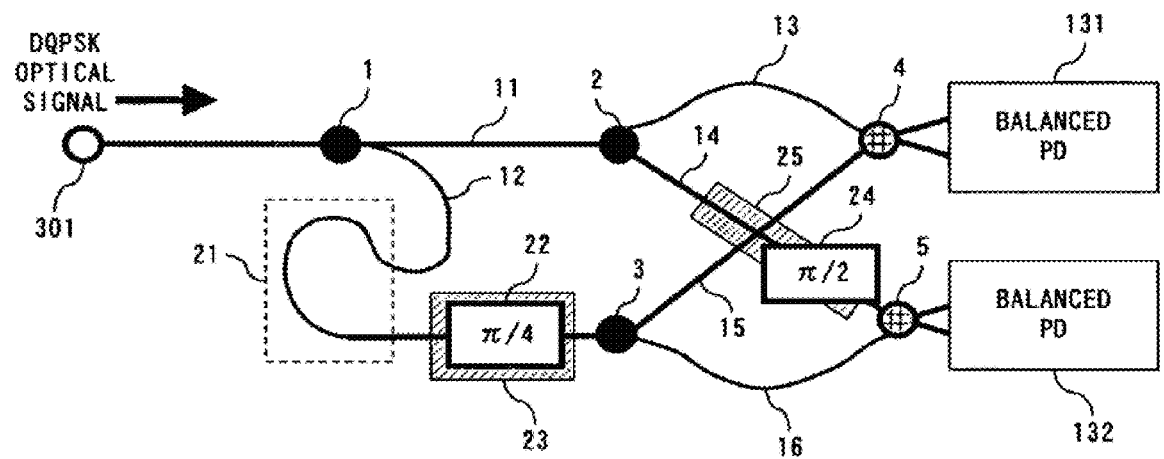
F I G. 4

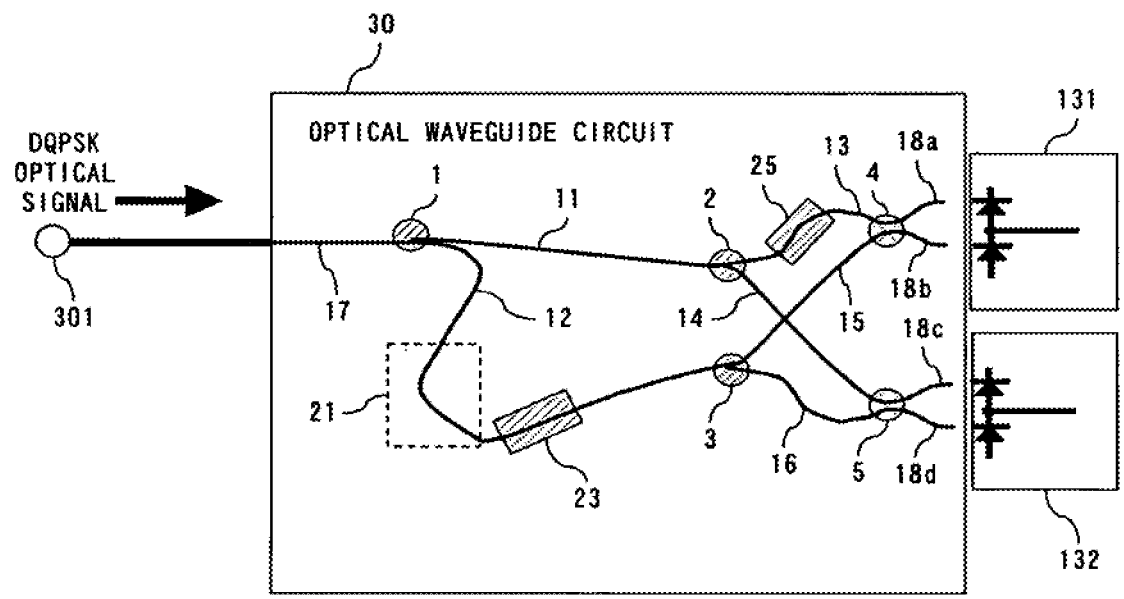
F I G. 1 1

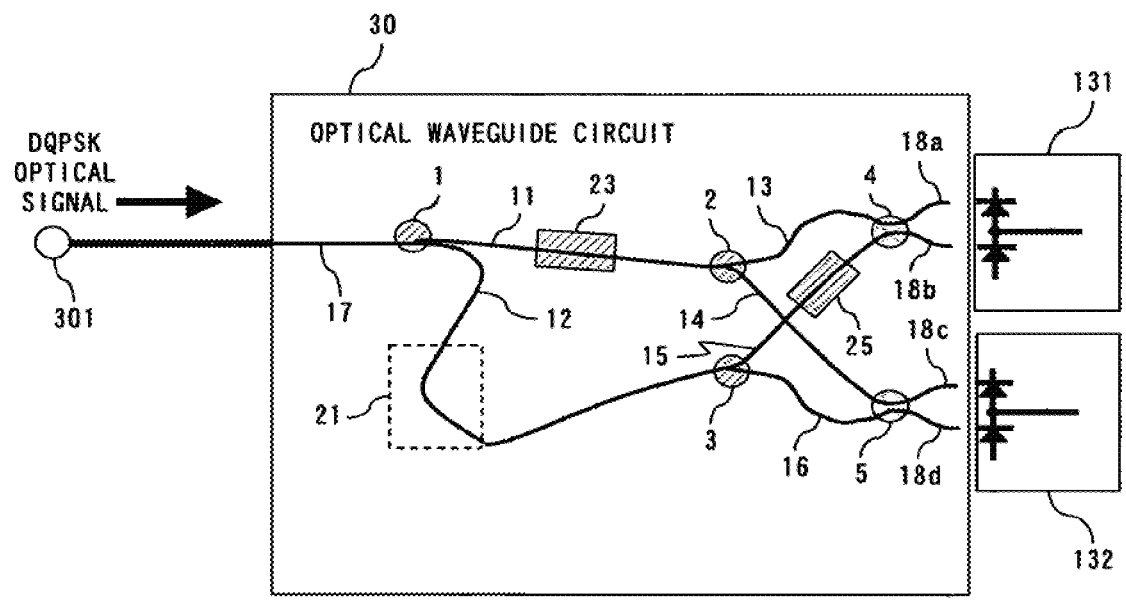
F I G. 1 2

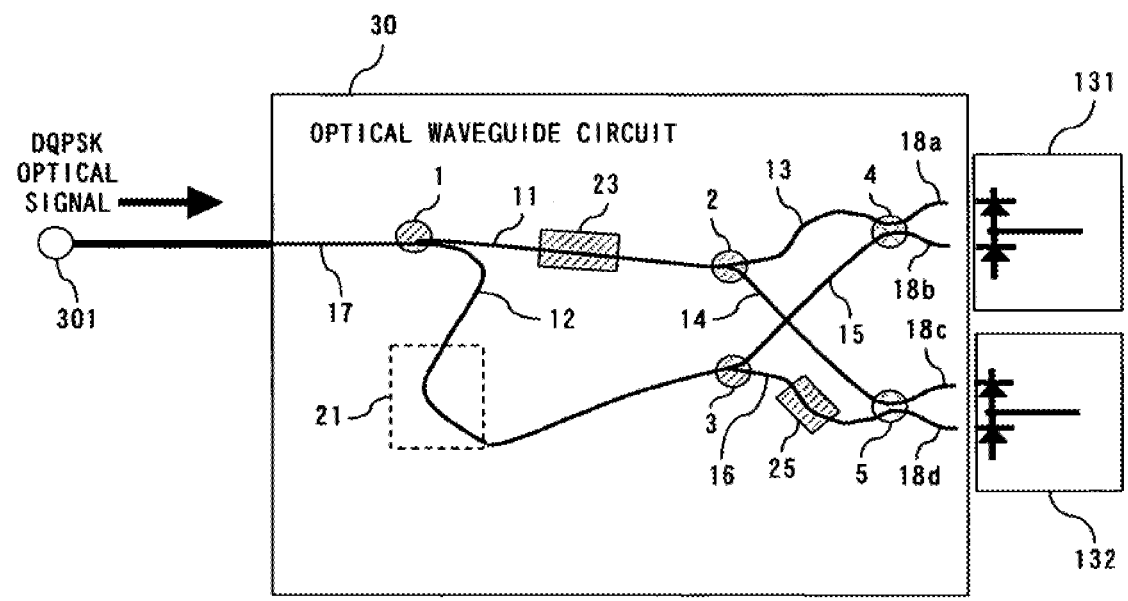
F I G. 1 3

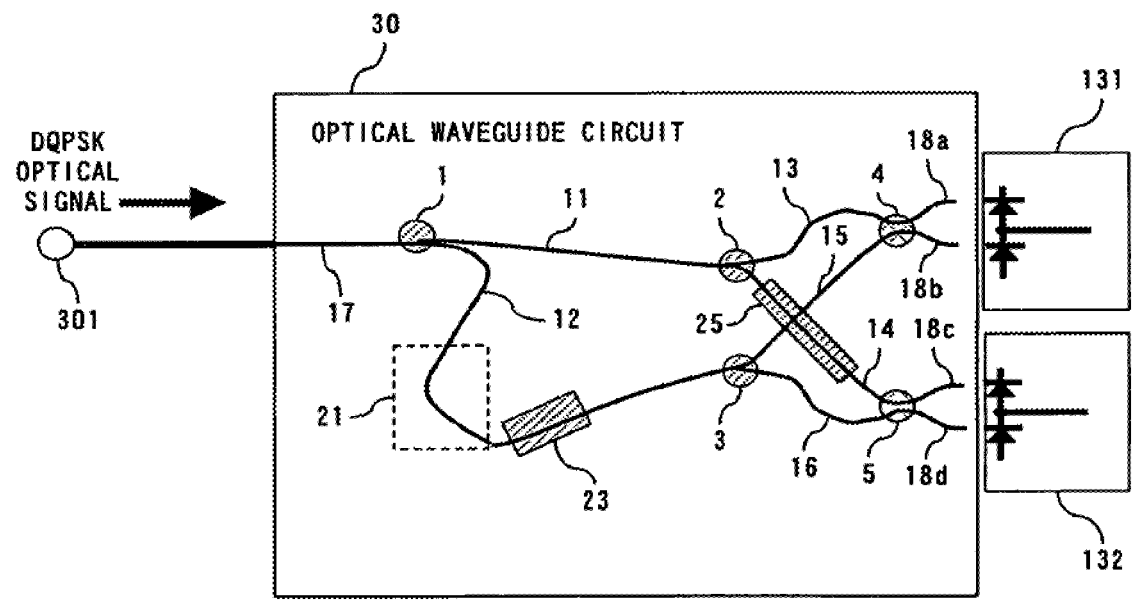
F I G. 1 4

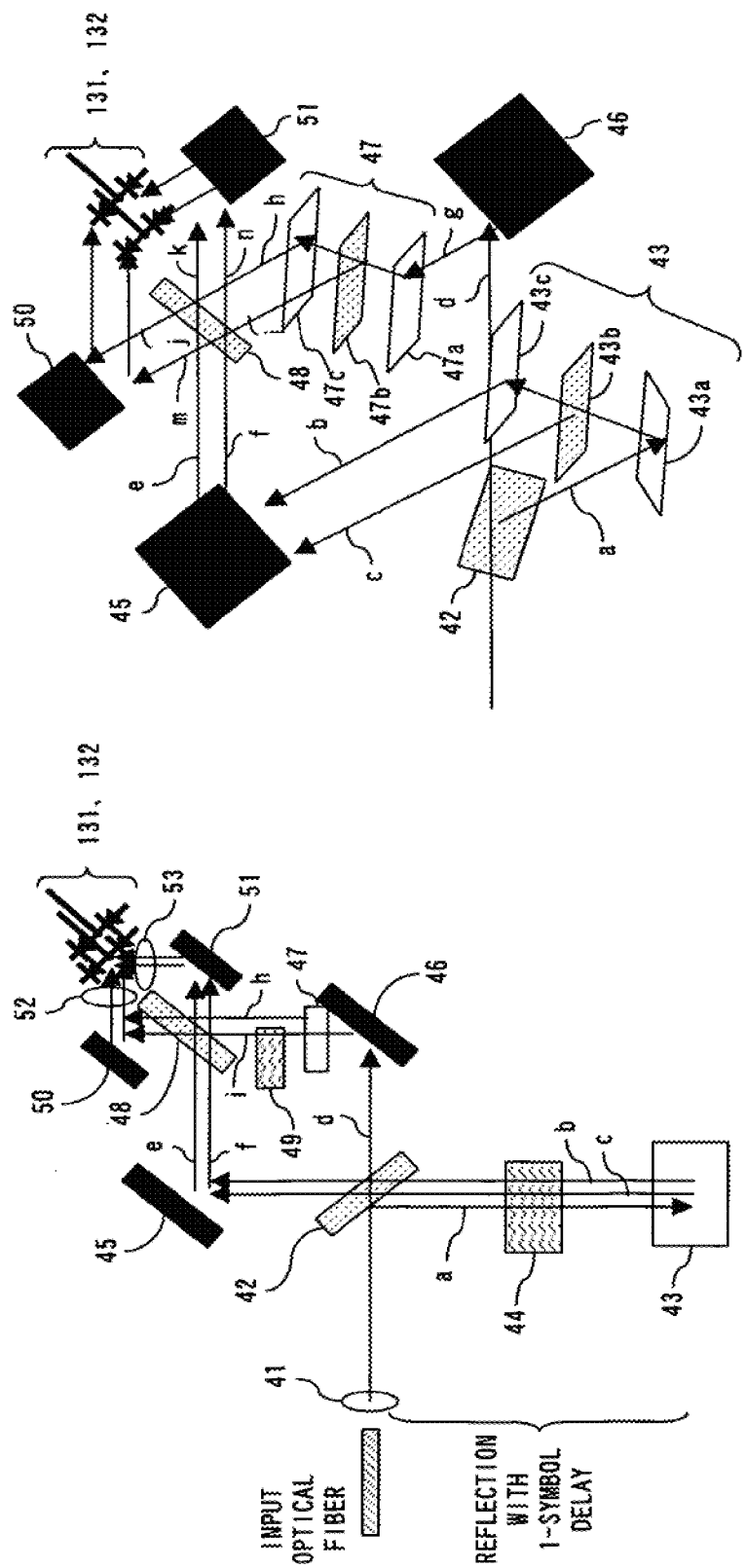

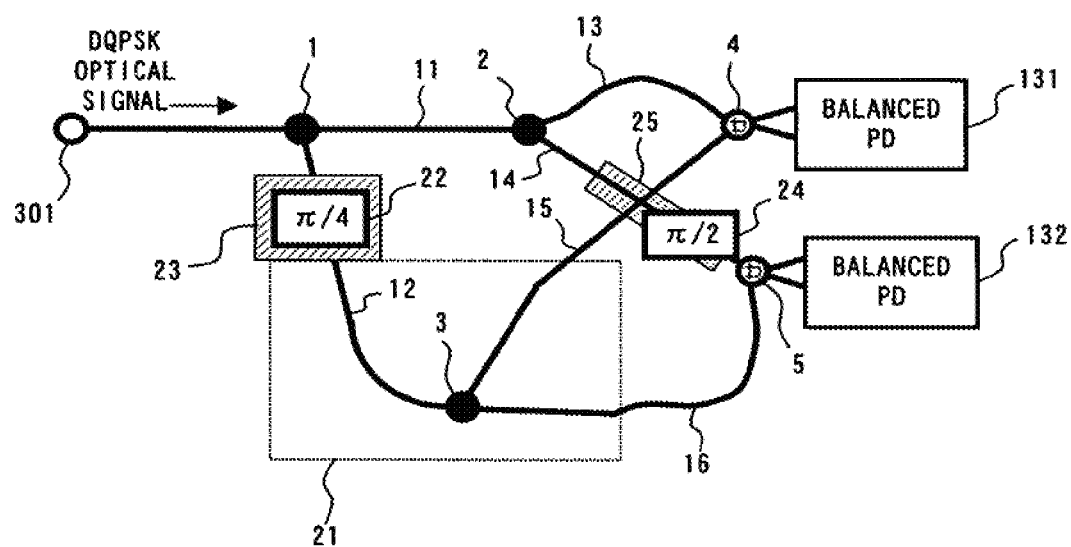
F I G. 1 9

DIFFERENTIAL MULTILEVEL MODULATED OPTICAL SIGNAL RECEIVER APPARATUS

This application is a divisional application of U.S. patent application Ser. No. 11/289,508, filed on Nov. 30, 2005, now U.S. Pat. No. 7,613,403, the disclosure of which is herein incorporated in its entirely by reference. This application claims the priority benefit of Japanese Application No. 2005-252659, the disclosure of which is herein incorporated in its entirely by reference.

BACKGROUND OF THE INVENTION

1. Field of the Invention

The present invention relates to a differential multilevel optical signal receiver apparatus for receiving an optical signal modulated by differential multilevel modulation.

2. Description of the Related Art

As a technology for transmitting signals in an optical transmission system, phase modulation has been put to practical use widely. In phase modulation, data is transmitted by shifting the phase of a carrier wave in accordance with the transmitted data. In Quadrature PhaseShift Keying (QPSK), for example, "$\theta$", "$\theta+\pi/2$", "$\theta+\pi$" and "$\theta+3\pi/2$" are assigned to each symbol comprising 2-bit data, "00", "01", "11" and "10", respectively. Here, "$\theta$" is an arbitrary phase. A receiver apparatus can regenerate the transmitted data by detecting the phase of the received signal.

When increasing the transmission speed or distance of a transmission path, deterioration of an optical S/N ratio becomes a problem in the receiver apparatus. In recent years, research and development of differential multilevel optical modulation has advanced as a modulation method which enables the improvement of receiver sensitivity. In this description, an explanation is provided of an example of Differential Quadrature Phase Shift Keying (DQPSK) modulation representing the modulation. In DQPSK modulation, the phase of a carrier wave ("$\theta$" "$\theta+\pi/2$", "$\theta+\pi$" or "$\theta+3\pi/2$") is determined in accordance with a "difference" between a symbol value transmitted previously and a symbol value to be transmitted next. Therefore, when demodulating the DQPSK signal in the receiver apparatus, a phase difference between the two consecutive symbols is detected.

FIG. 1 is a diagram describing an example of a conventional DQPSK optical receiver apparatus. In FIG. 1, an optical splitter 101 splits an input optical signal and guides the split signals to interferometers 110 and 120. The interferometer 110 comprises an optical splitter 111, a 1-symbol delay element 112, a $\pi/4$ phase shifter 113, and an optical coupler 114. In the interferometer 110, an optical signal arriving at the optical coupler 114 from the optical splitter 111 via the 1-symbol delay element 112 interferes with an optical signal arriving at the optical coupler 114 from the optical splitter 111 via the $\pi/4$ phase shifter 113. The interferometer 110 generates a pair of complementary optical signals. In the same manner, the interferometer 120 comprises an optical splitter 121, a 1-symbol delay element 122, a $-\pi/4$ phase shifter 123, and an optical coupler 124, and generates a pair of complementary optical signals. Balanced photodiodes 131 and 132 convert the optical signals output from the corresponding interferometers 110 and 120 into electrical signals. The signals acquired from the balanced photodiodes 131 and 132 are equivalent to the transmitted data.

A configuration and operation of the DQPSK optical receiver apparatus shown in FIG. 1 is described in, for example, Patent Document 1 (Japanese publication of translated version No. 2004-516743 (WO2002/051041 or US2004/0081470)) in detail.

FIG. 2 is a diagram showing another example of a conventional DQPSK optical receiver apparatus. In FIG. 2, a pair of the optical signals output from an optical splitter 101, are guided to optical splitters 141 and 142. One of the output signals of the optical splitter 141 is guided to an optical coupler 114 via a $\pi/4$ phase shifter 113, and the other output signal of the optical splitter 141 is guided to an optical coupler 124. In the same way, one of the output signals of the optical splitter 142 is guided to an optical coupler 124 via a $-\pi/4$ phase shifter 123, and the other output signal of the optical splitter 142 is guided to an optical coupler 114. At that time, the transmission time period corresponding to an optical path from the optical splitter 101 to the optical splitter 142 is longer than that corresponding to an optical path from the optical splitter 101 to the optical splitter 141 by the time period of 1-symbol. Consequently, the 1-symbol delay elements 112 and 122 shown in FIG. 1 are realized.

A configuration and operation of the DQPSK optical receiver apparatus shown in FIG. 2 is described in, for example, by Patent Document 2 (WO2003/063515) in detail.

The amount of phase shift in the $\pi/4$ phase shifter 113 and the $-\pi/4$ phase shifter 123 need to be adjusted with high precision in order to control data error. For that reason, in optical receiver apparatus for receiving high-speed data in particular, as shown in FIG. 2, adjuster units 115 and 125 may be configured for adjusting the amount of phase shift in the $\pi/4$ phase shifter 113 and the $\pi/4$ phase shifter 123. In the case the amount of phase shift in the $\pi/4$ phase shifter 113 and the $-\pi/4$ phase shifter 123 changes depending on the temperature, for example, the adjuster units 115 and 125 are heaters.

In Non-patent Document 1 (Michael Ohm, "Optical 8-DPSK and receiver with direct detection and multilevel electrical signals", Advanced Modulation Formats, 2004 IEEE/LEOS Workshop on 1-2 Jul. 2004, Pages 45-46.), for example, it is described how 8-DPSK (or $2^n$-DPSK where n is an integer) optical signal can be received by configuring a multilevel detection circuit for processing an electrical signal output, converted photoelectrically by a DQPSK optical receiver apparatus, as a multilevel signal. In addition, an optical signal modulated by DMAM (Differential M-ary Amplitude (shift keying) Modulation) such as a DQAM (Double Quadrature Amplitude Modulation) modulated signal can be received by using a multilevel detection circuit, using a similar technique to the reception of the 8-DPSK optical signal, after photoelectric conversion to an electrical signal.

In the configuration shown in FIG. 1, two 1-symbol delay elements (112 and 122) are required. Therefore, the configuration is not suitable for reducing the size of the optical receiver apparatus. Further, the 1-symbol delay elements 112 and 122 must be adjusted so as to have the same optical path length, and the adjustment is required in two lines. Therefore, the configuration is not favorable in terms of cost.

In the configuration shown in FIG. 2, the same function as that of the optical receiver apparatus shown in FIG. 1 can be provided with one 1-symbol delay element alone. However, in this configuration, the $\pi/4$ phase shifter 113 and the $-\pi/4$ phase shifter 123 have to be located close to each other in order to reduce the size of the optical receiver apparatus. For that reason, in an optical receiver apparatus comprising heaters, coolers or electrodes for electro-optic effects etc. as the adjuster units 115 and 125, thermal or electrical crosstalk occurs due to a spatial diffusion effect of the physical property, and thus there is a possibility that the amount of phase shift of the π/4 phase shifter 113 and the −π/4 phase shifter 123 can not be adjusted with high precision.

SUMMARY OF THE INVENTION

It is an object of the present invention to reduce the size of a differential multilevel optical signal receiver apparatus.

A differential multilevel optical signal receiver apparatus of the present invention comprises: a first optical splitter for splitting an input differential multilevel modulated optical signal and for generating a first optical signal and a second optical signal; a second optical splitter for splitting the first optical signal and for generating a third optical signal and a fourth optical signal; a third optical splitter for splitting the second optical signal and for generating a fifth optical signal and a sixth optical signal; a 1-symbol delay element configured between the first optical splitter and the third optical splitter; a π/4 phase shifter element configured between the first optical splitter and the third optical splitter; first adjustment means, configured adjacent to the π/4 phase shifter element, for adjusting the amount of phase shift of the π/4 phase shifter element; a first optical coupler for coupling the third optical signal and the fifth optical signal; a second optical coupler for coupling the fourth optical signal and the sixth optical signal; a π/2 phase shifter element, configured between the second optical splitter and the first optical coupler or between the second optical splitter and the second optical coupler; second adjustment means, configured adjacent to the π/2 phase shifter element, for adjusting the amount of phase shift of the π/2 phase shifter element; and a photodetector circuit for converting optical signals output from the first and second optical couplers into electrical signals.

In the above configuration, the 1-symbol delay element is shared by a pair of interferometers for demodulating a pair of modulated signals in the differential multilevel modulated optical signal. The first adjustment means for adjusting the amount of phase shift by the π/4 phase shifter element is configured in the input side of the second and third optical splitters, and the second adjustment means for adjusting the amount of phase shift by the π/2 phase shift element is configured in the output side of the second and third optical splitters. For that reason, the first adjustment means and the second adjustment means are spatially separated in the configuration. Therefore, the amount of phase shift of the π/4 phase shifter element is not affected by the second adjustment means, and the amount of phase shift of the π/2 phase shifter element is not affected by the first adjustment means.

In this configuration, it is also possible to configure the π/4 phase shifter element closer to the input side than the 1-symbol delay element, allowing further reduction of crosstalk.

The π/4 phase shifter element may be configured between the first optical splitter and the second optical splitter and the 1-symbol delay element may be configured between the first optical splitter and the third optical splitter. In such a case, the π/2 phase shifter element is configured between the third optical splitter and the first optical coupler, or between the third optical splitter and the second optical coupler.

According to the present invention, the number of the 1-symbol delay elements is reduced, and therefore the size of the differential multilevel optical signal receiver apparatus can be reduced. Even though the differential multilevel optical signal receiver apparatus is reduced in size, the amount of phase shift of the π/4 phase shifter element and the π/2 phase shifter element can be adjusted without being affected by each other, and thus it is possible to reduce the size of the apparatus without causing a deterioration of reception quality.

BRIEF DESCRIPTION OF THE DRAWINGS

FIG. 1 is a diagram describing an example of a conventional DQPSK optical receiver apparatus;

FIG. 4 is a diagram describing a first configuration of the DQPSK optical receiver apparatus of the present invention;

FIG. 11 is an embodiment of the DQPSK optical receiver apparatus of the second configuration;

FIG. 12 is an embodiment of the DQPSK optical receiver apparatus of the third configuration;

FIG. 13 is an embodiment of the DQPSK optical receiver apparatus of the fourth configuration;

FIG. 14 is a diagram describing a variation (1) of the configuration of the adjuster circuit;

FIG. 17A and FIG. 17B are embodiments of another mode of the DQPSK optical receiver apparatus of the present invention;

FIG. 19 is an example of a variation (1) of the first configuration; and

DESCRIPTION OF THE PREFERRED EMBODIMENTS

Figure 2:
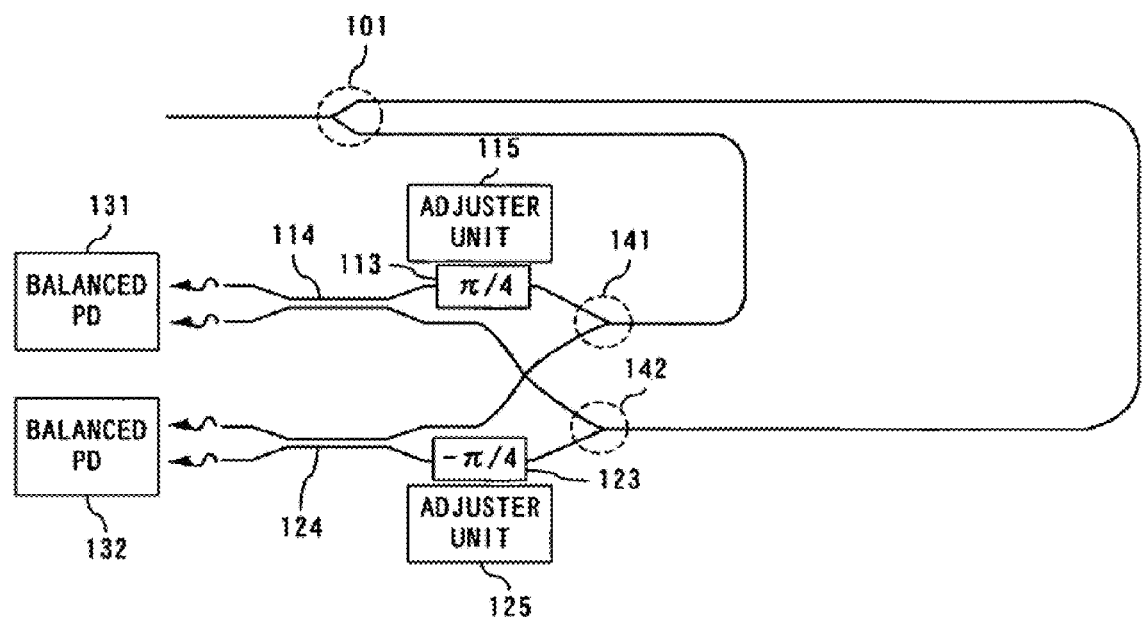
FIG. 2 is a diagram showing another example of a conventional DQPSK optical receiver apparatus.
Figure 3:
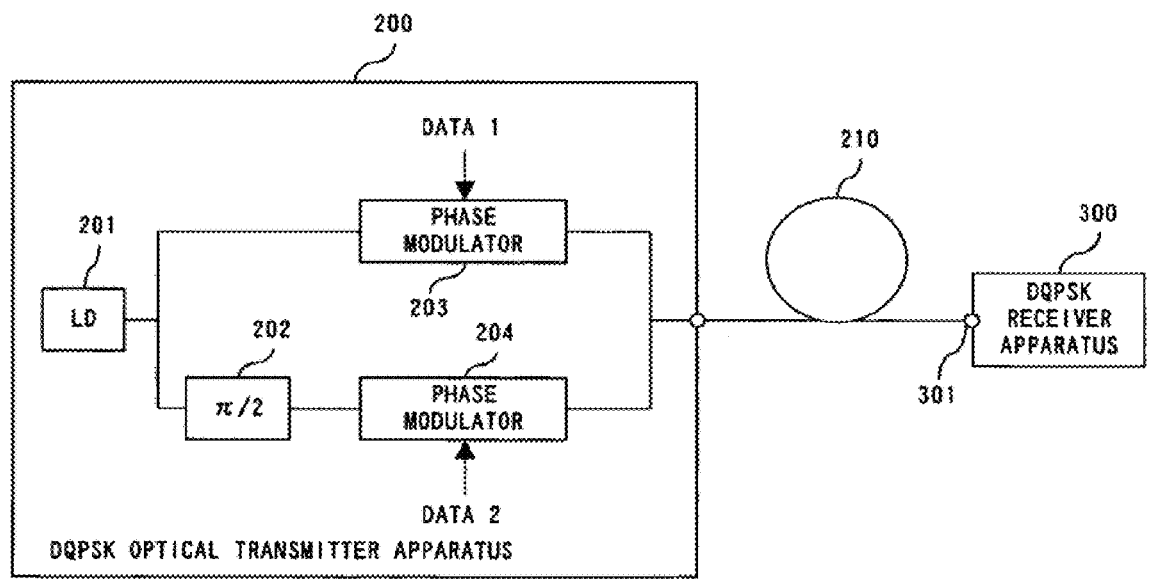
FIG. 3 is a diagram describing a configuration of an optical transmission system in which the DQPSK optical receiver apparatus of the present invention is configured.

FIG. 3 is a diagram describing a configuration of an optical transmission system in which the DQPSK optical receiver apparatus of the present invention is used. The DQPSK optical receiver apparatus is one mode of a differential multilevel optical signal receiver apparatus.

In FIG. 3, a DQPSK optical transmitter apparatus 200 comprises a light source (for example, Laser Diode LD) 201, a π/2 phase shifter 202, and phase modulators 203 and 204. The light source 201 generates optical CW (Continuous Wave) output. The wavelength of the optical CW source is not limited in particular; however, it is 1550 nm, for example. The π/2 phase shifter 202 provides a phase difference of π/2 between a pair of optical CW inputs to the phase modulators 203 and 204. The phase modulators 203 and 204 modulate the optical CW by data 1 and data 2, respectively. The data 1 and the data 2 here are bit streams generated by encoding the transmitted data using a DQPSK pre-coder, not shown in the drawings. A pair of the optical CW sources provided to the phase modulators 203 and 204 have phases differing from each other by 90 degrees. Therefore, when the optical signals generated by the phase shifters 203 and 204 are combined, for example, "θ" "θ+π/2", "θ+π" or "θ+3π/2" are assigned to each symbol "00", "01", "11" and "10". The DQPSK optical transmitter apparatus 200 transmits the DQPSK optical signal generated in the above manner.

The DQPSK optical signal is transmitted via an optical fiber 210, and is received by a DQPSK optical receiver apparatus 300. The DQPSK optical receiver apparatus 300 comprises an optical input port 301, and the DQPSK optical signal is guided to a DQPSK optical receiver circuit via the optical input port 301.

FIG. 4 is a diagram describing a first configuration of the DQPSK optical receiver apparatus of the present invention. The DQPSK optical receiver apparatus receives the DQPSK optical signal via the optical input port 301.

An optical splitter 1 splits an input optical signal, and outputs the signals to an optical path 11 and an optical path 12. Here, the splitting ratio of the optical splitter 1 is 1:1, and thus, optical signals having equal optical power are transmitted via the optical path 11 and the optical path 12. The optical path 11 is connected to an optical splitter 2, and the optical path 12 is connected to an optical splitter 3.

The optical splitter 2 splits the optical signal provided via the optical path 11, and outputs the signals to an optical path 13 and an optical path 14. Here, the splitting ratio of the optical splitter 2 is 1:1, and thus, optical signals having equal optical power are transmitted via the optical path 13 and the optical path 14. The optical path 13 is connected to an optical coupler 4, and the optical path 14 is connected to an optical coupler 5. In the same manner, the optical splitter 3 splits the optical signal provided via the optical path 12, and outputs the signals to an optical path 15 and an optical path 16. Here, the splitting ratio of the optical splitter 3 is 1:1, and thus, optical signals having equal optical power are transmitted via the optical path 15 and the optical path 16. The optical path 15 is connected to the optical coupler 4, and the optical path 16 is connected to the optical coupler 5.

The optical path 12, which connects the optical splitter 1 and the optical splitter 3, comprises a 1-symbol delay element 21 and a π/4 phase shifter element 22. The 1-symbol delay element 21 is a part of the optical path 12, and is a delay element for making the optical signal propagation time from the optical splitter 1 to the optical splitter 3 longer than the optical signal propagation time from the optical splitter 1 to the optical splitter 2 by "1-symbol time period". The 1-symbol delay element 21 can be realized, for example, by making the optical path length of the optical path 12 longer than that of the optical path 11 by "a length equivalent to 1-symbol time period". Here, if it is assumed that the symbol rate of the DQPSK optical signal is 20 G symbols/second, then the 1 symbol time period is 50 ps. Therefore, "the length equivalent to 1-symbol time period" is equivalent to the length that the light is propagated in the optical path 12 within 50 ps. The optical propagation speed depends on the refractive index of an optical path.

The π/4 phase shifter element 22 is a part of the optical path 12, and provides a phase difference of π/4 (that is, π/4+nπ/2 where n is an integer including zero) to a pair of optical signals transmitted via the optical path 11 and the optical path 12. The π/4 phase shifter element 22 is realized by adjusting the optical path length of the optical path 12 using an adjuster circuit 23. If the wavelength λ of the carrier wave of the optical signal is 1550 nm, "the length λ/8" to acquire the phase shift of π/4 is about 190 nm, and the physical length of the corresponding optical path is about 130 nm under the condition that the refractive index n is 1.5.

The optical path 14, which connects the optical splitter 2 and the optical coupler 5, comprises a π/2 phase shifter element 24. The π/2 phase shifter element 24 is a part of the optical path 14, and provides a phase difference of π/2 (that is, π/2+nπ where n is an integer including zero) to a pair of optical signals transmitted via the optical path 13 and the optical path 14. The π/2 phase shifter element 24 is realized by adjusting the optical path length of the optical path 14 using an adjuster circuit 25. Under the same conditions as above, "the length λ/4" to acquire the phase shift of π/2 is about 380 nm, and the physical length of the corresponding optical path is about 260 nm.

Both the adjuster circuits 23 and 25 adjust the optical path length of the optical paths 12 and 14, utilizing the change in the volume and refractive index of the optical path media with temperature. In such a case, the adjuster circuits 23 and 25 can be realized by for example, a heater utilizing electrical resistance, a Peltier effect element, or a light emitting element. The adjuster circuits 23 and 25 may be able to adjust the optical path length of the optical paths 12 and 14, respectively, using the changes in the refractive index with an electro-optic effect or electron density change in a semiconductor material. In this case, the adjuster circuits 23 and 25 can be realized by, for example, a circuit for adjusting the refractive index of the optical paths 12 and 14 using the electro-optic effect. In either case, the adjuster circuit 23 is configured so as to be adjacent to the π/4 phase shifter element 22 constituting a part of the optical path 12, and the adjuster circuit 25 is configured so as to be adjacent to the π/2 phase shifter element 24 constituting a part of the optical path 14.

The optical coupler 4 couples the optical signal transmitted via the optical path 13 and the optical signal transmitted via the optical path 15. These optical signals interfere with each other. The optical coupler 4 outputs a pair of complementary optical signals. In the same manner, the optical coupler 5 couples the optical signal transmitted via the optical path 14 and the optical signal transmitted via the optical path 16, and outputs a pair of complementary optical signals.

A balanced photodiode (photodetector circuit) 131 comprises a pair of photodiodes, and converts a pair of optical signals output from the optical coupler 4 into a pair of electrical signals. Then, the difference between the pair of electrical signals is output. Similarly, The balanced photodiode (photodetector circuit) 132 converts a pair of optical signals output from the optical coupler 5 into a pair of electrical signals, and outputs the difference.

In the DQPSK optical receiver apparatus with the above configuration, when an optical path (a first arm) from the optical splitter 1 to the optical coupler 4 via the optical splitter 2 is compared with an optical path (a second arm) from the optical splitter 1 to the optical coupler 4 via the optical splitter 3, the second arm comprises the 1-symbol delay element 21 and the π/4 phase shifter element 22. For that reason, the optical signal arriving at the optical coupler 4 via the second arm, when compared with the optical signal arriving at the optical coupler 4 via the first arm, is phase shifted by π/4, and is delayed by 1-symbol time period. Consequently, the interferometer comprising the first and the second arms is equivalent to the interferometer 120 shown in FIG. 1.

When an optical path (a third arm) from the optical splitter 1 to the optical coupler 5 via the optical splitter 2 is compared with an optical path (a fourth arm) from the optical splitter 1 to the optical coupler 5 via the optical splitter 3, the third arm comprises the $\pi/2$ phase shifter element 24, and the fourth arm comprises the 1-symbol delay element 21 and the $\pi/4$ phase shifter element 22. For that reason, when compared with the optical signal arriving at the optical coupler 5 via the third arm, the optical signal arriving at the optical coupler 5 via the fourth arm is phase shifted by $-\pi/4$, and is delayed by 1-symbol time period. In other words, $\pi/4$ phase shift occurs in the third arm, and 1-symbol delay occurs in the fourth arm. Therefore, the interferometer comprising the third and the fourth arms is equivalent to the interferometer 110 shown in FIG. 1.

The configuration of the DQPSK optical receiver apparatus of the embodiment shown in FIG. 4 is equivalent to the DQPSK optical receiver apparatus shown in FIG. 1. Hence, the output signal of the balanced photodiode 131 is equivalent to one of the data 1 or 2 before pre-coding, and the output signal of the balanced photodiode 132 is equivalent to the other. The operation of the optical receiver apparatus shown in FIG. 1 is described in the above Patent Document 1, for example.

The DQPSK optical receiver apparatus shown in FIG. 1 has a configuration comprising two 1-symbol delay elements. However, the DQPSK optical receiver apparatus of the present embodiment provides equivalent functionality with only one 1-symbol delay element 21. Therefore, the DQPSK optical receiver apparatus of the present embodiment can be smaller in size, compared with the DQPSK optical receiver apparatus shown in FIG. 1.

The optical splitters 1-3 are not limited in particular, but can be realized by, for example, an optical directional coupler, an MMI (Multimode Interference) optical coupler, or a Y-split optical coupler. The optical couplers 4 and 5 are not particularly limited either; however, they can be realized by, for example, an optical directional coupler, an MMI optical coupler, or an X optical coupler.

The adjuster circuits 23 and 25 operate independently of each other. At such a time, the adjuster circuits 23 and 25 may perform feedback control utilizing the output signals of the balanced photodiodes 131 and 132. The feedback control can be realized by, for example, comprising a monitor circuit for monitoring the error rate of the output signal of the balanced photodiodes 131 and 132 and by adjusting the optical path length of the corresponding optical paths 12 and 14 so as to reduce (or minimize) the error rate.

Figure 5:
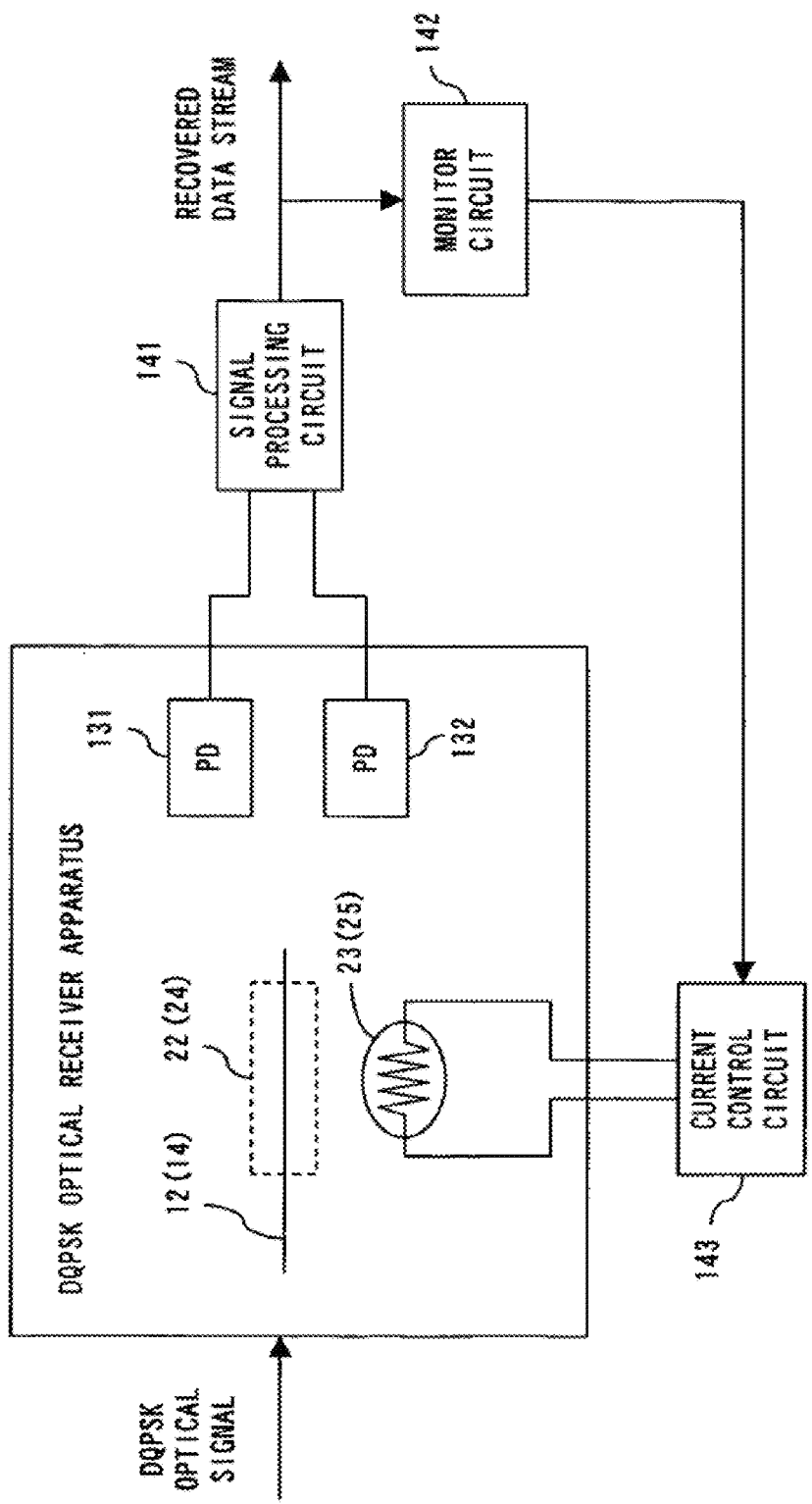
FIG. 5 is a diagram explaining the adjustment of the amount of phase shift.

FIG. 5 is a diagram explaining the adjustment of the amount of phase shift. In this descriptions a feedback system in which the optical path length of the $\pi/4$ phase shifter element 22 (or the $\pi/2$ phase shifter element 24) is adjusted utilizing thermal change is described. In such a case, the adjuster circuit 23 (or the adjuster circuit 25) is, for example, a heater generating heat by applying a current to a resistance. In FIG. 5, a signal processing circuit 141 performs necessary processing (multiplexing, bit rearrangement etc.) of the output signal of the balanced photodiodes 131 and 132, and recovers the data stream transmitted from the transmitter apparatus. A monitor circuit 142 monitors the bit error rate of the recovered data stream. Here, if the optical path length of the $\pi/4$ phase shifter element 22 (or the $\pi/2$ phase shifter element 24) (that is, the amount of phase shift) is adjusted properly, the error rate should be reduced. Therefore, the monitor circuit 142 generates an instruction to reduce the bit error rate of the recovered data stream. A current control circuit 143, in accordance with the instruction from the monitor circuit 142, controls the current passing through the adjuster circuit 23 (or the adjuster circuit 25). By so doing, the optical path length of the $\pi/4$ phase shifter element 22 (or the $\pi/2$ phase shifter element 24) is optimized, and the bit error rate of the recovered data stream is reduced.

In the DQPSK optical receiver apparatus with the above configuration, the adjuster circuits 23 and 25 are separated from each other. The adjuster circuit 23 is configured on the input side of the optical splitters 2 and 3, however the adjuster circuit 25 is configured on the output side of the optical splitters 2 and 3. Therefore, the control by the adjuster circuit 23 (the control to adjust the temperature of the $\pi/4$ phase shifter element 22, for example) hardly affects the $\pi/2$ phase shifter element 24, and the control by the adjuster circuit 25 (the control to adjust the temperature of the $\pi/2$ phase shifter element 24, for example) hardly affects the $\pi/4$ phase shifter element 22. As a result, the amount of phase shift of the $\pi/4$ phase shifter element 22 and the $\pi/2$ phase shifter element 24 is effectively independent and can be adjusted with high precision, and it is possible to reduce the size of the DQPSK optical receiver apparatus, controlling the data error.

In the DQPSK optical receiver apparatus with the above configuration, it is desirable that the difference between the optical path length of the optical path 11 and the optical path length which is the difference between the optical path length of the 1-symbol delay element 21 and the optical path length of the optical path 12, is less than a multiplicative factor of 200 of the wavelength of the DQPSK optical signal. It is also desirable that the optical path lengths of the optical paths 13-16 are approximately the same. In particular, the difference between the optical path length of the optical path 13 and the optical path length of the optical path 14 should be within a multiplicative factor of 200 of the wavelength of the DQPSK optical signal. In addition, the difference between the optical path length of the optical path 15 and the optical path length of the optical path 16 should be also within a multiplicative factor of 200 of the wavelength of the DQPSK optical signal. These relations are applicable not only to the first configuration but also to the second through the fourth configurations explained later.

Figure 6:
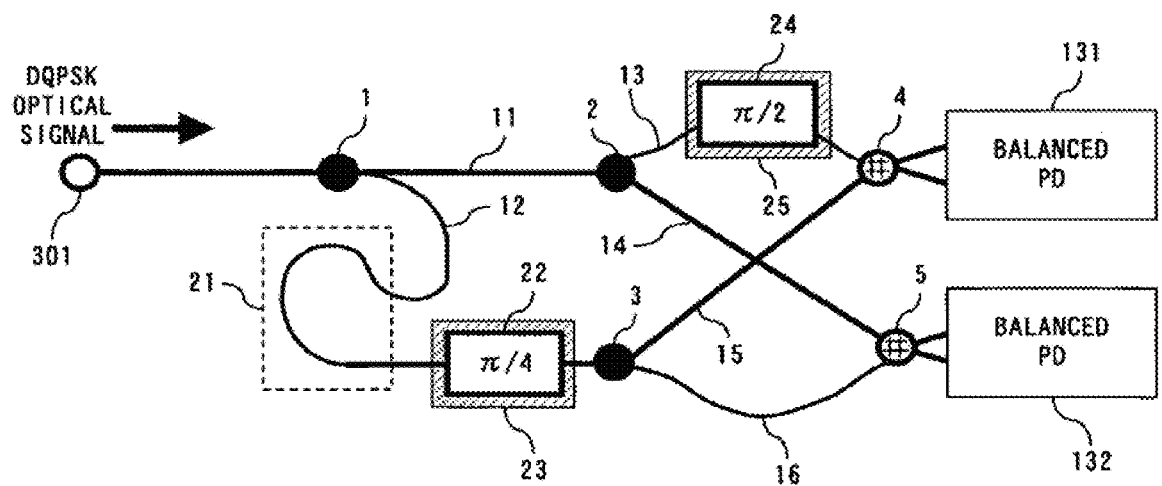
FIG. 6 is a diagram describing a second configuration of the DQPSK optical receiver apparatus of the present invention.

FIG. 6 is a diagram describing a second configuration of the DQPSK optical receiver apparatus of the present invention. The second configuration is basically the same as the first configuration. In the first configuration, the $\pi/2$ phase shifter element 24 is configured in the optical path 14, which connects the optical splitter 2 and the optical coupler 5. However, in the second configuration, the $\pi/2$ phase shifter element 24 is configured in the optical path 13, which connects the optical splitter 2 and the optical coupler 4.

In the DQPSK optical receiver apparatus with the above configuration, an optical path (a first arm) from the optical splitter 1 to the optical coupler 4 via the optical splitter 2 is compared with an optical path (a second arm) from the optical splitter 1 to the optical coupler 4 via the optical splitter 3, the first arm comprises the $\pi/2$ phase shifter element 24, and the second arm comprises the 1-symbol delay element 21 and the $\pi/4$ phase shifter element 22. For that reason, when compared with the optical signal arriving at the optical coupler 4 via the first arm, the optical signal arriving at the optical coupler 4 via the second arm is phase shifted by $-\pi/4$ and delayed by 1-symbol time period. In other words, a $\pi/4$ phase shift occurs in the first arm, and a 1-symbol delay occurs in the second arm. Thus, the interferometer comprising the first and the second arms is equivalent to the interferometer 110 shown in FIG. 1.

When an optical path (a third arm) from the optical splitter 1 to the optical coupler 5 via the optical splitter 2 is compared with an optical path (a fourth arm) from the optical splitter 1 to the optical coupler 5 via the optical splitter 3, the fourth arm comprises the 1-symbol delay element 21 and the π/4 phase shifter 22. For that reason, when compared with the optical signal arriving at the optical coupler 5 via the third arm, the optical signal arriving at the optical coupler 5 via the fourth arm is phase shifted by π/4, and delayed by 1-symbol time period. In other words, a −π/4 phase shift occurs in the third arm, and a 1-symbol delay occurs in the fourth arm. Therefore, the interferometer comprising the third and the fourth arms is equivalent to the interferometer 120 shown in FIG. 1.

As described above, the DQPSK optical receiver apparatus with the second configuration is equivalent to the DQPSK optical receiver apparatus shown in FIG. 1. The same effect as that of the first configuration shown in FIG. 1 can also be obtained by the second configuration.

Figure 7:
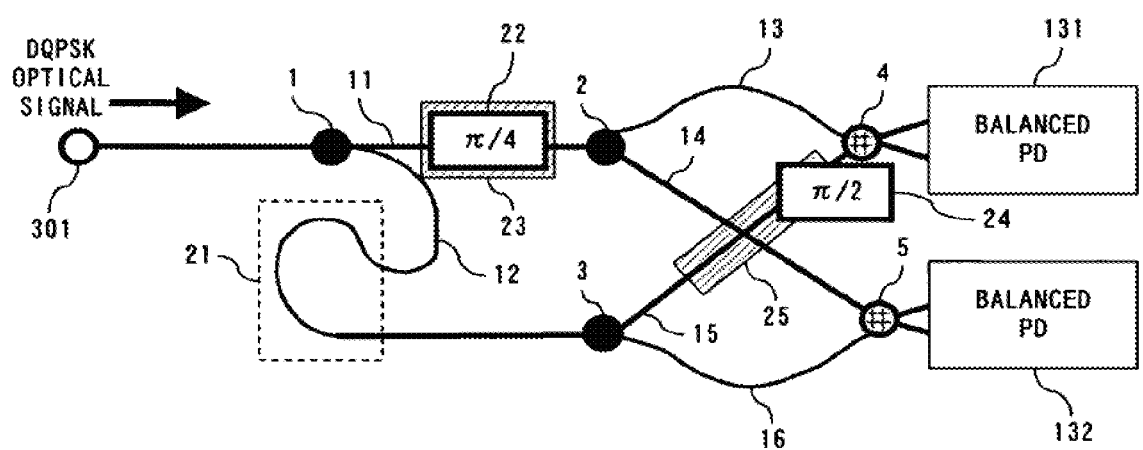
FIG. 7 is a diagram describing a third configuration of the DQPSK optical receiver apparatus of the present invention.

FIG. 7 is a diagram describing a third configuration of the DQPSK optical receiver apparatus of the present invention. In the first configuration, the π/4 phase shifter element 22 is configured in the optical path 12, which connects the optical splitter 1 and the optical splitter 3, and the π/2 phase shifter element 24 is configured in the optical path 14, which connects the optical splitter 2 and the optical coupler 5. In the third configuration, however, the π/4 phase shifter element 22 is configured in the optical path 11, which connects the optical splitter 1 and the optical splitter 2, and the π/2 phase shifter element 24 is configured in the optical path 15, which connects the optical splitter 3 and the optical coupler 4.

In the DQPSK optical receiver apparatus with the above configuration, when an optical path (a first arm) from the optical splitter 1 to the optical coupler 4 via the optical splitter 2 is compared with an optical path (a second arm) from the optical splitter 1 to the optical coupler 4 via the optical splitter 3, the first arm comprises the π/4 phase shifter element 22, and the second arm comprises the 1-symbol delay element 21 and the π/2 phase shifter element 24. For that reason, when compared with the optical signal arriving at the optical coupler 4 via the first arm, the optical signal arriving at the optical coupler 4 via the second arm is phase shifted by π/4, and is delayed by 1-symbol time period. In other words, a −π/4 phase shift occurs in the first arm, and a 1-symbol delay occurs in the second arm. Consequently, the interferometer comprising the first and the second arms is equivalent to the interferometer 120 shown in FIG. 1.

When an optical path (a third arm) from the optical splitter 1 to the optical coupler 5 via the optical splitter 2 is compared with an optical path (a fourth arm) from the optical splitter 1 to the optical coupler 5 via the optical splitter 3, the third arm comprises the π/4 phase shifter element 22, and the fourth arm comprises the 1-symbol delay element 21. For that reason, when compared with the optical signal arriving at the optical coupler 5 via the third arm, the optical signal arriving at the optical coupler 5 via the fourth arm is phase shifted by −π/4, and is delayed by 1-symbol time period. In other words, a π/4 phase shift occurs in the third arm, and a 1-symbol delay occurs in the fourth arm. Therefore, the interferometer comprising the third and the fourth arms is equivalent to the interferometer 110 shown in FIG. 1.

As described above, the DQPSK optical receiver apparatus of the third configuration is equivalent to the DQPSK optical receiver apparatus shown in FIG. 1. In the third configuration, also, the same effect as that of the first configuration shown in FIG. 4 can be obtained.

Figure 8:
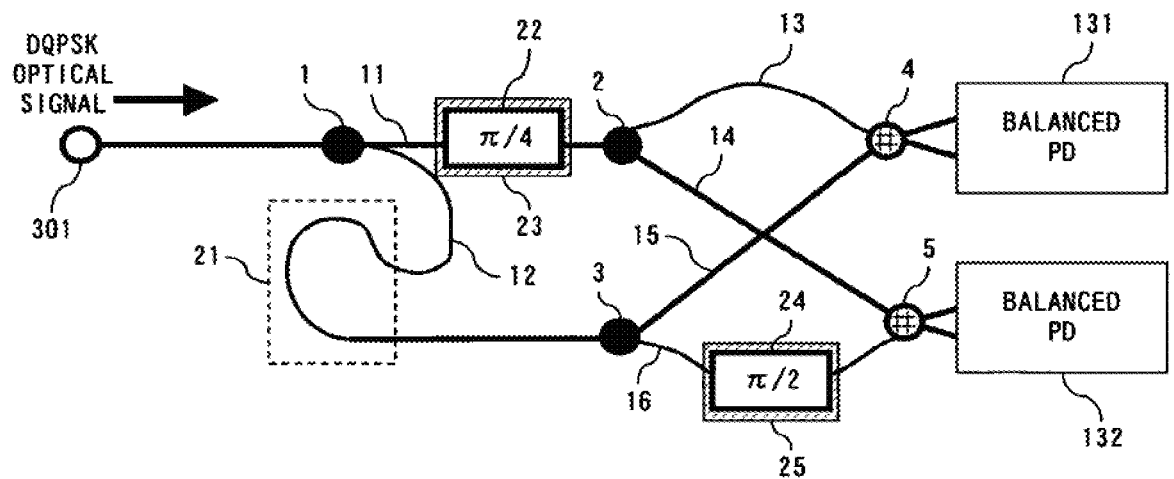
FIG. 8 is a diagram describing a fourth configuration of the DQPSK optical receiver apparatus of the present invention.

FIG. 8 is a diagram describing a fourth configuration of the DQPSK optical receiver apparatus of the present invention. The fourth configuration is basically the same as the third configuration. In the third configuration, the π/2 phase shifter element 24 is configured in the optical path 15, which connects the optical splitter 3 and the optical coupler 4. On the other hand, in the fourth configuration, the π/2 phase shifter element 24 is configured in the optical path 16, which connects the optical splitter 3 and the optical coupler 5.

In the DQPSK optical receiver apparatus with the above configuration, when an optical path (a first arm) from the optical splitter 1 to the optical coupler 4 via the optical splitter 2 is compared with an optical path (a second arm) from the optical splitter 1 to the optical coupler 4 via the optical splitter 3, the first arm comprises the π/4 phase shifter element 22, and the second arm comprises the 1-symbol delay element 21. For that reason, when compared with the optical signal arriving at the optical coupler 4 via the first arm, the optical signal arriving at the optical coupler 4 via the second arm is phase shifted by −π/4, and is delayed by 1-symbol time period. In other words, a π/4 phase shift occurs in the first arm, and a 1-symbol delay occurs in the second arm. Consequently, the interferometer comprising the first and the second arms is equivalent to the interferometer 110 shown in FIG. 1.

When an optical path (a third arm) from the optical splitter 1 to the optical coupler 5 via the optical splitter 2 is compared with an optical path (a fourth arm) from the optical splitter 1 to the optical coupler 5 via the optical splitter 3, the third arm comprises the π/4 phase shifter element 22, and the fourth arm comprises the 1-symbol delay element 21 and the π/2 phase shifter element 24. For that reason, when compared with the optical signal arriving at the optical coupler 5 via the third arm, the optical signal arriving at the optical coupler 5 via the fourth arm is phase shifted by π/4, and is delayed by 1-symbol time period. In other words, a −π/4 phase shift occurs in the third arm, and a 1-symbol delay occurs in the fourth arm. Therefore, the interferometer comprising the third and the fourth arms is equivalent to the interferometer 120 shown in FIG. 1.

As described above, the DQPSK optical receiver apparatus with the fourth configuration is equivalent to the DQPSK optical receiver apparatus shown in FIG. 1. In the fourth configuration, also, the same effect as that of the first configuration shown in FIG. 4 can be obtained.

Figure 9:
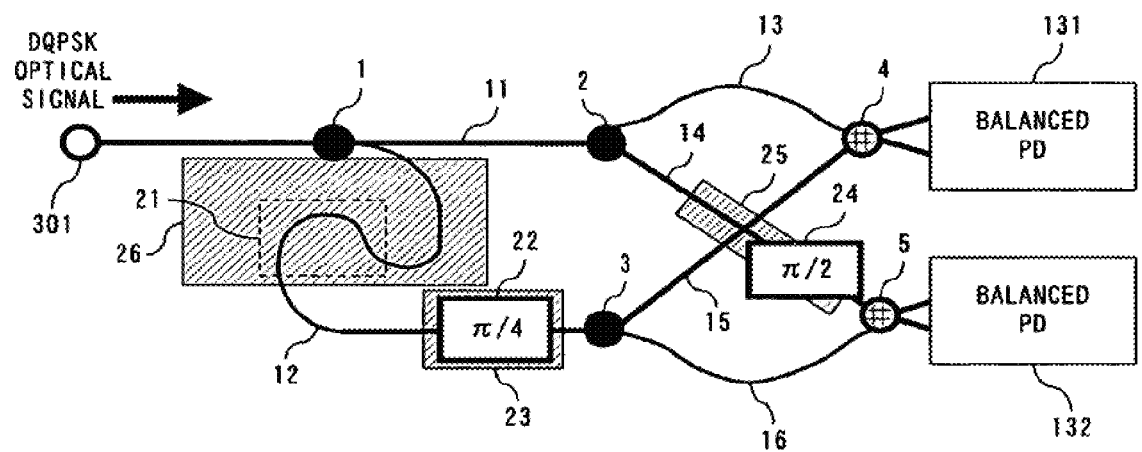
FIG. 9 is a diagram showing a configuration of the DQPSK optical receiver apparatus comprising a function for adjusting a 1-symbol delay element.
Figure 10:
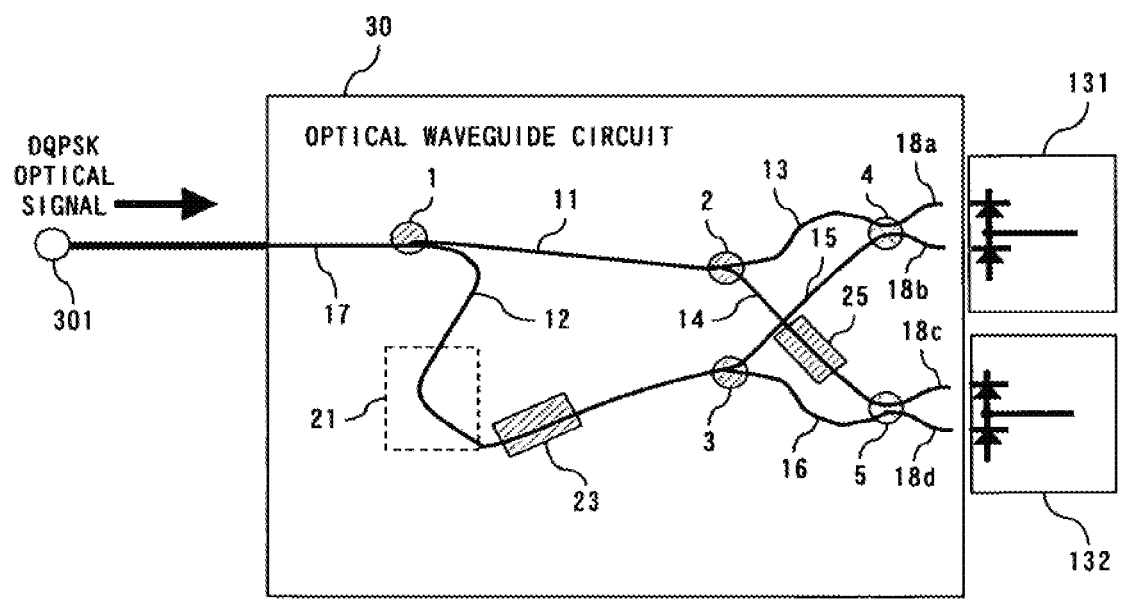
FIG. 10 is an embodiment of the DQPSK optical receiver apparatus of the first configuration.

In the above embodiments, the adjuster circuits 23 and 25 adjust the amount of phase shift of the π/4 phase shifter element 22 and the π/2 phase shifter element 24, respectively. The DQPSK optical receiver apparatus of the present embodiments may comprise an adjuster circuit 26 for adjusting the optical path length of the 1-symbol delay element 21, as shown in FIG. 9. In such a case, the adjuster circuit 26 can be realized by, as in the adjuster circuits 23 and 25, a heater utilizing an electrical resistance, a Peltier effect element, or a light emitting element, for example. Alternatively, the adjuster circuit 26 may adjust the optical path length of the 1-symbol delay element 21 by utilizing a change in the refractive index. The adjuster circuit 26 can be configured in the DQPSK optical receiver apparatus with the first through the fourth configurations. However, in any case, the adjuster circuit 26 is configured adjacent to the 1-symbol delay element 21.

FIG. 10 through FIG. 13 are the DQPSK optical receiver apparatus of the first through the fourth embodiments, respectively, of the present invention. In these embodiments, the optical splitters 1-3, the optical couplers 4 and 5, and the optical paths 11-16 are realized by a two-dimensional optical waveguide circuit formed on the upper surface of an optical waveguide substrate 30. The adjuster circuits 23 and 25 are configured on the optical waveguide substrate 30. Additionally, an optical waveguide 17 to which the DQPSK optical signal is incident is formed on a prescribed end (input side end) of the optical waveguide substrate 30. And, the optical waveguides 18a-18d, which transmit the output signal of the optical couplers 4 and 5, are formed at the other end (end different from the input side end) of the optical waveguide substrate 30. In other words, the optical input port 301 and the balanced photodiodes 131 and 132 are configured on separate side ends of the optical waveguide substrate 30.

In the case that the DQPSK optical receiver apparatus of the present embodiments is realized by a two-dimensional optical waveguide circuit, the optical paths 14 and 15 intersect with each other on one plane. However, a technology to avoid the interference of optical signals transmitted via two intersecting optical waveguides has been known heretofore (for example, see Japanese laid-open unexamined patent publication No. 2001-343542, Japanese laid-open unexamined patent publication No. 57-88410, and Japanese Patent No. 3201554).

As described above, when the DQPSK optical receiver apparatus is realized by a two-dimensional optical waveguide circuit, it is possible to reduce the size of the apparatus.

Figure 15:
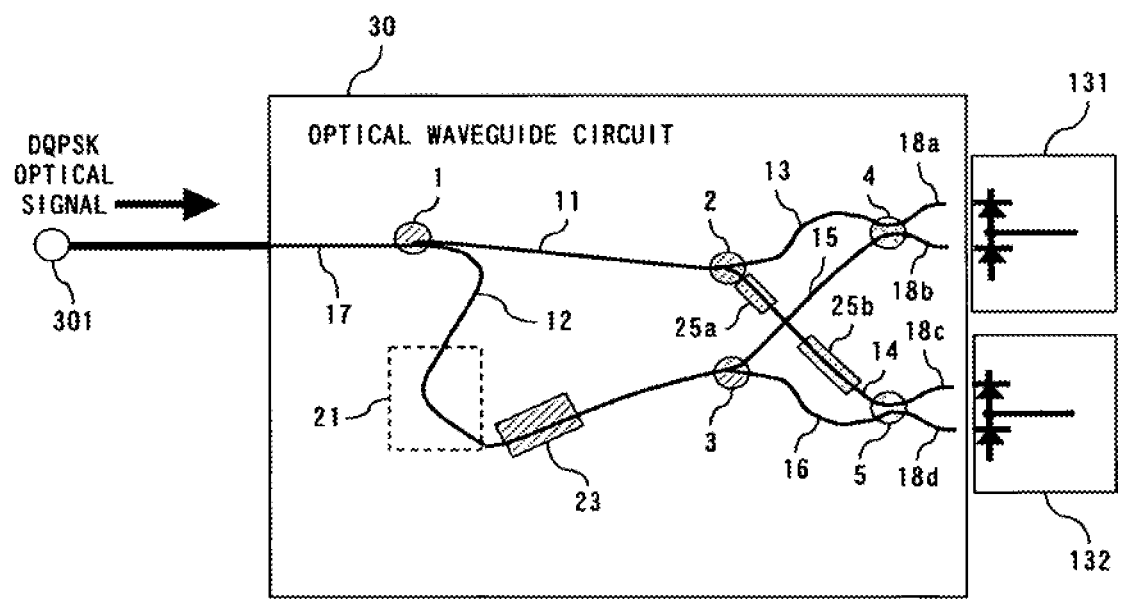
FIG. 15 is a diagram describing a variation (2) of the configuration of the adjuster circuit.

FIG. 14 and FIG. 15 are diagrams describing variations of the configuration of the adjuster circuit 25. In an example shown in FIG. 14, the adjuster circuit 25 is configured in a region, which includes the intersection of the optical path 14 and the optical path 15. According to this configuration, the configuration of the adjuster circuit 25 is simple. In an example shown in FIG. 15, the adjuster circuit 25 (25a and 25b) is divided so that it is configured in two regions, which do not include the intersection. According to this configuration, the control by the adjuster circuit 25 ("heat control" when the adjuster circuit 25 is a heater) does not affect the optical path 15, and thus, improvement of the adjustment precision is expected. In the region, which does not include the intersection of the optical path 14 and the optical path 15, not shown in the drawings in particular, an undivided adjuster circuit 25 may be configured.

Figure 16:
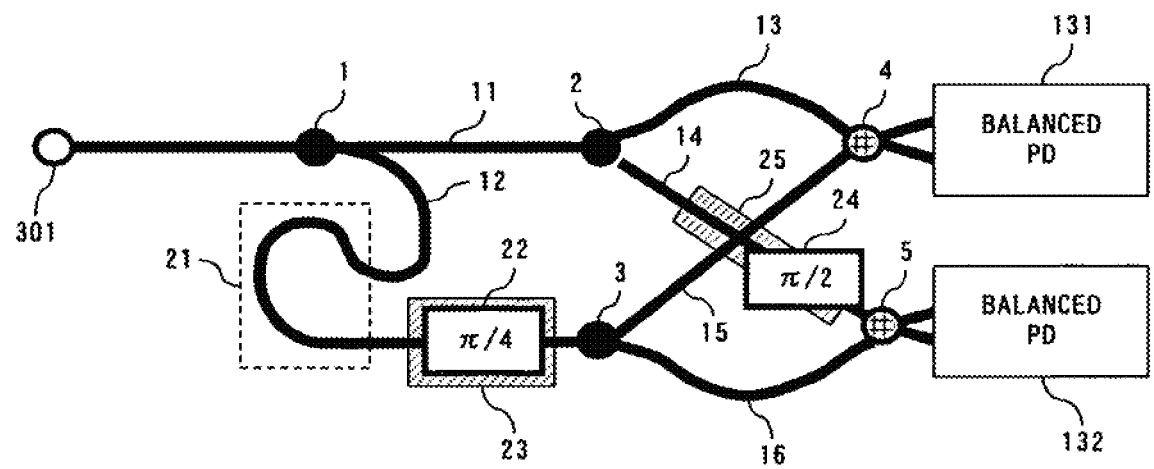
FIG. 16 is an embodiment of the DQPSK optical receiver apparatus with its optical path realized by an optical fiber.

In the DQPSK optical receiver apparatus of the present embodiments, each of the optical paths 11-16 can be configured by an optical fiber, as shown in FIG. 16. In such a case, it is desirable to use a single mode optical fiber. Alternatively, a polarization maintaining single mode optical fiber may be used. An optical directional coupler, a multimode interference optical coupler, a Y-split optical coupler etc. for example, can be used as the optical splitters 1-3 and the optical couplers 4 and 5.

FIG. 17A and FIG. 17B are embodiments of another aspect of the DQPSK optical receiver apparatus of the present invention. FIG. 17A is a schematic diagram showing a top view of the propagation of an optical signal in the optical receiver apparatus. FIG. 17B is a schematic diagram showing an oblique perspective view of the propagation of the optical signal in the optical receiver apparatus. FIG. 17A and FIG. 17B describe the same optical receiver apparatus.

Figure 18B:
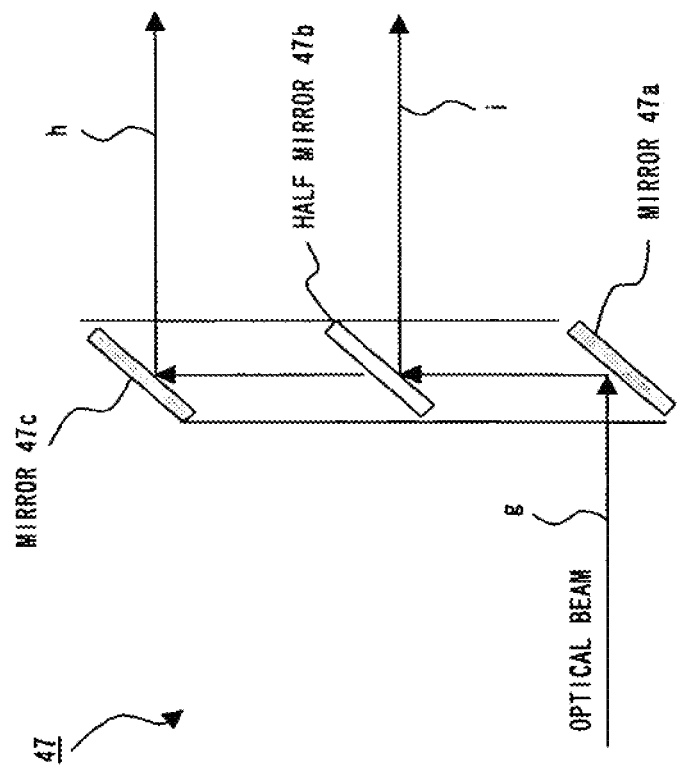
FIG. 18A and FIG. 18B are embodiments of reflection devices shown in FIG. 17A and FIG. 17B.
Figure 18A:
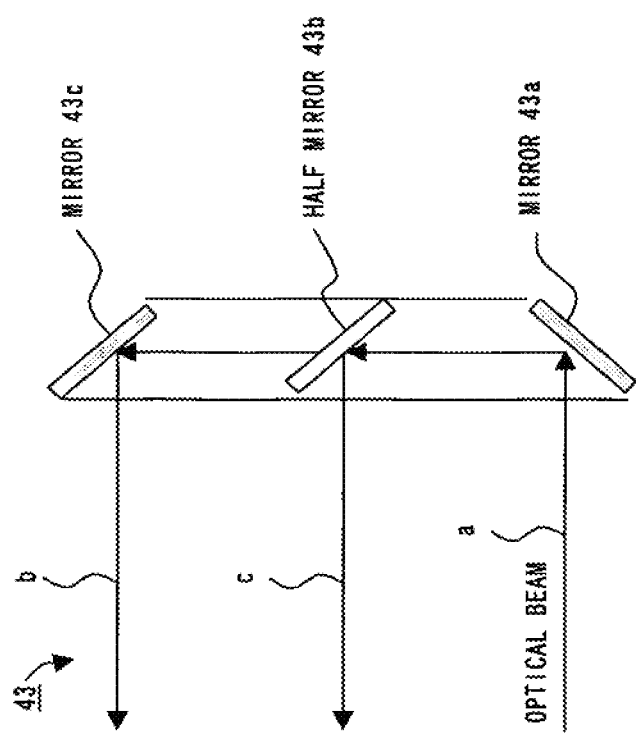

In FIG. 17A and FIG. 17B, the input DQPSK optical signal is directed to a half mirror 42 via a lens 41. The optical beam a, reflected by the half mirror 42, is directed to a reflection device 43. The reflection device (optical beam shift and half mirror) 43, comprising a mirror 43a, a half mirror 43b, and a mirror 43c as shown in FIG. 18A, generates a pair of parallel optical beams b and c, and directs the beams to a mirror 45. In other words, the optical beam reflected by the mirror 43a is split by the half mirror 43b. The optical beam b, which passed through the half mirror 43b, is reflected by the mirror 43c, and then, is directed to the mirror 45. The optical beam c, reflected by the half mirror 43b, is also directed to the mirror 45. However, the optical beam d, which passed through the half mirror 42, is directed to the mirror 46.

Here, the optical path length of the optical path from the half mirror 42 to the mirror 45 via the reflection device 43 is ΔL longer than the optical path length of the optical path from the half mirror 42 to the mirror 46. The ΔL is equivalent to the distance that an optical beam is propagated in 1-symbol time period. By this means a 1-symbol delay element is achieved. A π/4 phase shifter element 44 is configured in the optical path from the half mirror 42 to the mirror 45 via the reflection device 43. The π/4 phase shifter element 44 is realized by adjusting the optical path length of the optical path from the half mirror 42 to the mirror 45 via the mirror 43.

A pair of optical beams e and f reflected by the mirror 45 is split by a half mirror 48. The optical beam g reflected by the mirror 46 is directed to a reflection device 47. The configuration of the reflection device 47 is basically the same as that of the reflection device 43, comprising a mirror 47a, a half mirror 47b and a mirror 47c as shown in FIG. 18B, and it generates a pair of parallel optical beams h and i. The pair of optical beams h and i is split by the half mirror 48. A π/2 phase shifter element 49 is configured in one of the pair of optical paths (the optical path propagating the optical beam i) from the mirror 46 to the half mirror 48. The π/2 phase shifter element 49 is realized by adjusting the optical path length of the optical path from the mirror 46 to the half mirror 48.

In the half mirror 48, a pair of optical beams j and k is obtained from the interference between the optical beams e and h. The optical beam j is directed to one of the photodiodes in the balanced photodiode 131 via a mirror 50 and a condenser lens 52, and the optical beam k is directed to the other photodiode of the balanced photodiode 131 via a mirror 51 and a condenser lens 53. In the same manner, a pair of optical beams m and n is obtained from the interference between the optical beams f and i. The optical beam m is directed to one of the photodiodes in the balanced photodiode 132 via the mirror 50 and the condenser lens 52, and the optical beam n is directed to the other photodiode in the balanced photodiode 132 via the mirror 51 and the condenser lens 53.

In the above configuration, the optical splitter 1 shown in FIG. 4 is equivalent to the half mirror 42. The optical splitter 2 is equivalent to the reflection device 47. The optical splitter 3 is equivalent to the reflection device 47. The optical couplers 4 and 5 are equivalent to the half mirror 48. Each of the mirrors and half mirrors is a mirror which does not provide a phase difference between the p-polarization and s-polarization.

In the DQPSK optical receiver apparatus with the above first configuration and the second configuration, the optical splitters 1 and 2 can be replaced by one optical device. In such a case, the optical splitters 1 and 2 can be replaced by a multimode interference coupler or a 1:3 optical coupler etc., for example.

Figure 20:
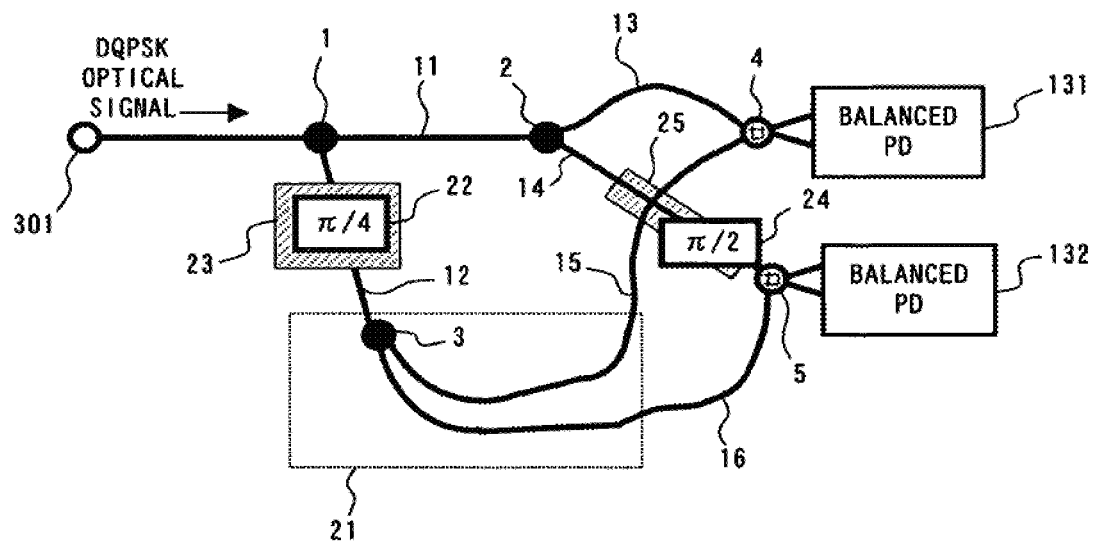
FIG. 20 is an example of a variation (2) of the first configuration.

FIG. 19 and FIG. 20 are examples of variations of the first configuration shown in FIG. 4. In the configuration shown in FIG. 19, the optical splitter 3 is configured within the 1-symbol delay element 21. In such a case, the 1-symbol delay element 21 is Y-shaped. The 1-symbol delay element 21 is formed so that the propagation time of the optical path from the optical splitter 1 to the optical coupler 4 via the optical splitter 3 is 1-symbol time period longer than that of the optical path from the optical splitter 1 to the optical coupler 4 via the optical splitter 2, and that the propagation time of the optical path from the optical splitter 1 to the optical coupler 5 via the optical splitter 3 is 1-symbol time period longer than that of the optical path from the optical splitter 1 to the optical coupler 5 via the optical splitter 2.

In the configuration shown in FIG. 20, the optical splitter 3 is configured immediately after the π/4 delay element 22, and 1-symbol delay elements are configured in parallel in the later stage. In such a case, also, the 1-symbol delay element 21 is formed so that the propagation time of the optical path from the optical splitter 1 to the optical coupler 4 via the optical splitter 3 is 1-symbol time period longer than the propagation time of the optical path from the optical splitter 1 to the optical coupler 4 via the optical splitter 2, and the propagation time of the optical path from the optical splitter 1 to the optical coupler 5 via the optical splitter 3 is 1-symbol time period longer than the propagation time of the optical path of the optical splitter 1 to the optical coupler 5 via the optical splitter 2.

What is claimed is:

1. A differential multilevel optical signal receiver apparatus, comprising:
   a first optical splitter for splitting an input differential multilevel optical signal and for generating a first optical signal and a second optical signal;
   a second optical splitter for splitting the first optical signal and for generating a third optical signal and a fourth optical signal;
   a third optical splitter for splitting the second optical signal and for generating a fifth optical signal and a sixth optical signal;
   a $\pi/4$ phase shifter element configured between the first optical splitter and the second optical splitter;
   first adjustment means, configured adjacent to the $\pi/4$ phase shifter element, for adjusting the amount of phase shift of the $\pi/4$ phase shifter element;
   a 1-symbol delay element configured between the first optical splitter and the third optical splitter;
   a first optical coupler for coupling the third optical signal and the fifth optical signal;
   a second optical coupler for coupling the fourth optical signal and the sixth optical signal;
   a $\pi/2$ phase shifter element, configured between the third optical splitter and the first optical coupler, or between the third optical splitter and the second optical coupler;
   second adjustment means, configured adjacent to the $\pi/2$ phase shifter element, for adjusting the amount of phase shift of the $\pi/2$ phase shifter element; and
   a photodetector circuit for converting optical signals output from the first and second optical couplers into electrical signals.

2. A differential multilevel optical signal receiver apparatus, comprising:
   a first optical device for splitting an input differential multilevel optical signal and for generating a first optical signal and a second optical signal;
   a second optical device for splitting the first optical signal and for generating a third optical signal and a fourth optical signal;
   a third optical device for splitting the second optical signal and for generating a fifth optical signal and a sixth optical signal;
   a fourth optical device for coupling the third optical signal and the fifth optical signal;
   a fifth optical device for coupling the fourth optical signal and the sixth optical signal;
   a $\pi/4$ phase shifter element for shifting the phase of the second optical signal by $\pi/4$;
   first adjustment means, configured adjacent to the $\pi/4$ phase shifter element, for adjusting the amount of phase shift of the $\pi/4$ phase shifter element;
   a 1-symbol delay element comprising a part of an optical path configured between the first optical device and the third optical device, a part of an optical path configured between the third optical device and the fourth optical device, and a part of an optical path configured between the third optical device and the fifth optical device;
   a $\pi/2$ phase shifter element for shifting the phase of the fourth optical signal by $\pi/2$;
   second adjustment means, configured adjacent to the $\pi/2$ phase shifter element, for adjusting the amount of phase shift of the $\pi/2$ phase shifter element; and
   a photodetector circuit for converting optical signals output from the fourth optical device and the fifth optical device into electrical signals, wherein
   the 1-symbol delay element makes the propagation time of an optical path from the first optical device to the fourth optical device via the third optical device 1-symbol time period longer than the propagation time of an optical path from the first optical device to the fourth optical device via the second optical device,
   the 1-symbol delay element makes the propagation time of an optical path from the first optical device to the fifth optical device via the third optical devive 1-symbol time period longer than the propagation time of an optical path from the first optical device to the fifth optical device via the second optical device.

3. A differential multilevel optical signal receiver apparatus, comprising:
   a first optical device for splitting an input differential multilevel optical signal and for generating a first optical signal and a second optical signal;
   a second optical device for splitting the first optical signal and for generating a third optical signal and a fourth optical signal;
   a third optical device for splitting the second optical signal and for generating a fifth optical signal and a sixth optical signal;
   a fourth optical device for coupling the third optical signal and the fifth optical signal;
   a fifth optical device for coupling the fourth optical signal and the sixth optical signal;
   a $\pi/4$ phase shifter element for shifting the phase of the second optical signal by $\pi/4$;
   first adjustment means, configured adjacent to the $\pi/4$ phase shifter element, for adjusting the amount of phase shift of the $\pi/4$ phase shifter element;
   a 1-symbol delay element for delaying each of the fifth and the sixth optical signals by 1-symbol time period;
   a $\pi/2$ phase shifter element for shifting the phase of the fourth optical signal by $\pi/2$;
   second adjustment means, configured adjacent to the $\pi/2$ phase shifter element, for adjusting the amount of phase shift of the $\pi/2$ phase shifter element; and
   a photodetector circuit for converting optical signals output from the fourth optical device and the fifth optical device into an electrical signals.

* * * * *